United States Patent
Kim et al.

(10) Patent No.: US 10,394,975 B2
(45) Date of Patent: Aug. 27, 2019

(54) DEVICE AND METHOD FOR CALCULATING STABILITY AND PREDICTING ERROR OF POWER SYSTEM NETWORK

(71) Applicant: Korea Electric Power Corporation, Naju-si, Jeollanam-do (KR)

(72) Inventors: Chung Hyo Kim, Daejeon (KR); Yong Hun Lim, Daejeon (KR); Seong Ho Ju, Daejeon (KR); Kyung Seok Jeon, Seongnam-si (KR); Jong Kwan Kim, Namyangju-si (KR); Chang Hwan Sung, Namyangju-si (KR)

(73) Assignee: Korea Electric Power Corporation, Naju-si, Jeollanam-do (KR)

( * ) Notice: Subject to any disclaimer, the term of this patent is extended or adjusted under 35 U.S.C. 154(b) by 190 days.

(21) Appl. No.: 15/315,296

(22) PCT Filed: Jul. 24, 2015

(86) PCT No.: PCT/KR2015/007744
§ 371 (c)(1),
(2) Date: Nov. 30, 2016

(87) PCT Pub. No.: WO2016/018008
PCT Pub. Date: Feb. 4, 2016

(65) Prior Publication Data
US 2017/0193141 A1    Jul. 6, 2017

(30) Foreign Application Priority Data

Jul. 30, 2014    (KR) .................... 10-2014-0097600

(51) Int. Cl.
*G06F 17/11* (2006.01)
*G06F 17/50* (2006.01)
(Continued)

(52) U.S. Cl.
CPC .......... *G06F 17/5009* (2013.01); *G06F 17/11* (2013.01); *G06F 17/50* (2013.01);
(Continued)

(58) Field of Classification Search
CPC ...... G06F 17/5009; G06F 17/50; G06F 17/11; G06F 2217/16; G06Q 50/06
(Continued)

(56) References Cited

U.S. PATENT DOCUMENTS 6,212,049 B1    4/2001    Spencer et al.
7,102,490 B2    9/2006    Flen et al.
(Continued)

FOREIGN PATENT DOCUMENTS

CA    2503583 C    10/2012
KR    10-0728823 B1    6/2007
(Continued)

OTHER PUBLICATIONS

Canadian Office Action dated Aug. 24, 2017 issued in Canadian Patent Applicatiln No. 2950737.
(Continued)

*Primary Examiner* — Saif A Alhija
(74) *Attorney, Agent, or Firm* — Morgan, Lewis & Bockius LLP (57) ABSTRACT

The present invention relates to a device and a method for calculating stability and predicting an error of a power system network, the device comprising: a standard object information reception unit for receiving standard object information provided by a power system network; a connection state stability calculation unit for calculating connection state stability ($S_{state}$) using the standard object information; a connection time stability calculation unit for calculating connection time stability ($S_{time}$) using the standard object information; a network connection stability
(Continued)

calculation unit for calculating a final network connection stability using the network connection state stability ($S_{state}$) and the connection time stability ($S_{time}$); and an error prediction information display unit for displaying error prediction information including at least one of network path information, a network state value, the final network connection stability, the connection state stability ($S_{state}$), and the connection time stability ($S_{time}$).

12 Claims, 7 Drawing Sheets (51) Int. Cl.
  *G06Q 10/06* (2012.01)
  *G06Q 50/06* (2012.01)
(52) U.S. Cl.
  CPC ............ *G06Q 10/06* (2013.01); *G06Q 50/06* (2013.01); *G06F 2217/16* (2013.01)
(58) Field of Classification Search
  USPC .......................................................... 703/2
  See application file for complete search history.

(56) References Cited

U.S. PATENT DOCUMENTS

| 8,639,922 B2 | 1/2014 | Phatak |
| 2009/0009180 A1 | 1/2009 | Varghai et al. |
| 2017/0193141 A1 | 7/2017 | Kim et al. |

FOREIGN PATENT DOCUMENTS

| KR | 10-2008-0027517 A | 3/2008 |
| KR | 10-2012-0074041 A | 7/2012 |
| KR | 10-2014-0028710 A | 3/2014 |
| KR | 10-2014-0042361 A | 4/2014 |
| KR | 110-2016-0015519 A | 2/2016 |
| WO | 2016-018008 A1 | 2/2016 |

OTHER PUBLICATIONS

International Search Report dated Oct. 21, 2015 issued in International Patent Application No. PCT/KR2015/007744 (with English translation).

Canadian Office Action dated Jul. 10, 2018 issued in Canadian Patent Application No. 2950737.

| RANGE OF STABILITY | DESCRIPTION | RESPONSE MANUAL |
|---|---|---|
| $S < 1.5$ | STABLE NETWORK STATE | NO RESPONSE |
| $1.5 \leq S < 2.5$ | NETWORK CONNECTION STATE WHICH IS NOT IN GENERAL STATE | • RETRY TO CONNECT AND CHECK ALTERNATIVE PATH STATE<br>- DETERMINE IMPORTANCE OF INFORMATION FROM CORRESPONDING PATH<br>- INFORM IN ADVANCE HOST SYSTEM OF DANGER CAUSED WHEN INFORMATION IS LOST |
| $2.5 \leq S < 3.5$ | UNSTABLE NETWORK CONNECTION STATE | • NEED IMMEDIATE RESPONSE FOR ALTERNATIVE CONNECTION<br>- MONITOR LIST OF ALTERNATIVE PATHS AND STATES THEREOF<br>- PREPARE TO DEPLOY ANOTHER ALTERNATIVE PATH AND EQUIPMENT WHEN ALTERNATIVE-PATH CONNECTION FAILS |
| $3.5 \leq S$ | STATE IN WHICH CONNECTION TO NETWORK IS DIFFICULT TO BE MAINTAINED | DEPLOY BACKUP (NETWORK) EQUIPMENT AND PERFORM PATH CHANGING |

| NAME OF INFORMATION | | DETAILED INFORMATION | EXAMPLE 1 | EXAMPLE 2 |
|---|---|---|---|---|
| STANDARD OBJECT INFORMATION | | ConnRtryCnt | 3 | 3 |
| | | ConnFailRtryCnt | 3 | 3 |
| | | ConnRej | 0 | 2 |
| | | # of AltPthSt.Path | 2 | 0 |
| | | # of NetAltPth | 3 | 3 |
| | | ConnCurTmms | 60s | 85s |
| | | ConnAvTmms | 70s | 70s |
| INVENTION INFORMATION | R | NETWORK PATH | CONNECTION | TEMPORARY ERROR |
| | F | NETWORK STATE | | |
| | S | STABILITY | 1.0 | 3.4 |
| | $S_{state}$ | CONNECTION STATE STABILITY | 75%(1, NORMAL) | 17%(4, SERIOUS) |
| | $S_{time}$ | CONNECTION TIME STABILITY | 86%(1, NORMAL) | 143%(1, NORMAL) |
| OPERATOR'S RESPONSE | | | NO RESPONSE | IMMEDIATE RESPONSE FOR ALTERNATIVE CONNECTION |

DEVICE AND METHOD FOR CALCULATING STABILITY AND PREDICTING ERROR OF POWER SYSTEM NETWORK

RELATED APPLICATIONS

This application is the U.S. National Phase under 35 U.S.C. § 371 of International Application No. PCT/KR2015/007744, filed on Jul. 24, 2015, which in turn claims the benefit of Korean Patent Application Nos. 10-2014-0097600, filed on Jul. 30, 2014, the disclosure of which applications are incorporated by reference herein.

TECHNICAL FIELD

The present invention relates to a device and method for calculating stability of a power system network and predicting an error thereof, and more particularly, to a device and method for calculating stability of a power system network and predicting an error thereof, which are capable of calculating stability of the power system network in a formula on the basis of standard object information and predicting an error thereof using the stability.

BACKGROUND ART

Recently, when key operation information of a substation cannot be exchanged in a power system due to a network problem, an operator's manipulation and determination of an automated device may be interrupted and thus large-scale economic and social damages such as a power failure accident may occur.

Thus, the International Electro-technical Commission (IEC) prescribed a standard (IEC62351-7) for network and system management (NSM) information specialized for power systems and provided it to global utilities, thereby contributing to stable operation of power systems.

The NSM information according to the above standard is different from a general IT environment in that a main path and alternative paths of a network, data type, etc. are defined beforehand according to a specific pattern so that an alarm may be generated when a network path or data which does not match the specific pattern occurs.

According to the standard (IEC62351-7) for the NSM information specialized for power systems, an object for connection and maintenance of a network is defined as in Table 1 below.

TABLE 1

| Classification | Name of information (object) | Type | Description |
|---|---|---|---|
| Configuration value | ConnRtryCnt | Integer | Number of times to retry to connect to network to change state from temporary error state to permanent error state |
|  | ConnRtryTmms | Time | Time interval between retries of connection in temporary error state |
|  | ConnFailRtryCnt | Integer | Number of times to retry to connect in permanent error state |
|  | ConnFailRtryTmms | Time | Time interval between retries of connection in permanent error state |
|  | NetAltPth | OI Array | List of alternative paths to main path |
| Operational value | RsTmms | Time | Total time period after reset |
|  | ConnTotTmms | Time | Total connection time after reset |
|  | ConnCurTmms | Time | Current-connection-state maintenance time after connection to network |
|  | ConnAvTmms | Time | Average connection time |
|  | ConnFailTot | Count | Number of errors occurring in normal connections state |
|  | ConnRej | Integer | Number of times to reject trying to connect |
|  | AltPthSt | Status | States of alternative paths to main path |
| Alarm | ConnAlm | Alarm | Alarm for temporary connection error |
|  | ConnFailAlm | Alarm | Alarm for permanent connection error |
|  | ConnFlovAlm | Alarm | Alarm for alternative connection |

In Table 1 above, the 'configuration value' represents values designated beforehand for network maintenance, the 'operational value' represents state values generated during actual operation of the network, and the 'alarm' represents important information to be delivered to an operator.

However, information which an operator can intuitively know among the information shown in Table 1 above (standard object information) is only information indicating whether an alarm is generated or not. The information shown in Table 1 above does not include information enabling the operator to determine current stability of a network. That is, only a major problem or an error of the network is reported to the operator and information enabling the operator to predict the problem or error beforehand is not provided to the operator.

For example, the scale of an electric power accident may vary according to an operator's initial response thereto as known in previous electric power accident cases (e.g., the California electricity crisis, the South Korea 915 rolling blackout, etc.). That is, the scale of the electric power accident is significantly influenced by a response time of several seconds to several tens of seconds at an initial stage thereof. Thus, if information enabling the operator to predict the electric power accident is provided to the operator before an alarm is generated, the scale of this accident may be dramatically reduced.

However, information directly delivered to an operator among the NSM information according to the standard prescribed by the IEC is only alarm information (i.e., an alarm regarding a network error result), and information enabling the operator to predict a risk of an electric power accident is not provided. Accordingly, the operator cannot notice a state of a network before a network error occurs and thus cannot respond to prevent occurrence and expansion of an accident before the network error occurs (or before an alarm is generated).

The background technology of the present invention is disclosed in Korean Patent No. 10-0728823, entitled "System and Method for Estimating an Voltage Stability of Power System" (registered on Jun. 8, 2007).

DISCLOSURE

Technical Problem

In order to solve the above problem, the present invention is directed to a device and method for calculating stability of a power system network in a formula on the basis of standard object information and predicting an error thereof using the stability.

Technical Solution

One aspect of the present invention provides a device for calculating stability of a power system network and predicting an error thereof, the device including a standard object information reception unit configured to receive standard object information from a power system network; a connection state stability calculation unit configured to calculate connection state stability $S_{state}$ representing whether a network connection state is stable on the basis of the standard object information; a connection time stability calculation unit configured to calculate connection time stability $S_{time}$ representing whether a network connection time is stably maintained on the basis of the standard object information; a network connection stability calculation unit configured to calculate final network connection stability using the network connection state stability $S_{state}$ and the connection time stability $S_{time}$; and an error prediction information display unit configured to display error prediction information. The standard object information includes at least one of: a number of times to retry to connect to the network ConnRtryCnt until a state is changed from a temporary error state to a permanent error state; a number of times to retry to connect to the network ConnFailRtryCnt in the permanent error state; a number of times to reject trying to connect to the network ConnRej; a list of alternative paths to a main path NetAltPth; states of the alternative paths to the main path AltPthSt; and an available valid path availablePath. The standard object information includes at least one of: an average connection time ConnAvTmms; and a current-connection-state maintenance time ConnCurTmms after connection to the network. The error prediction information may include at least one of: the final network connection stability; the connection state stability $S_{state}$; the connection time stability $S_{time}$; and network path information and values of states of the network.

In the present invention, the error prediction information display unit may classify and display the final network connection stability in stages including at least one among state changing, a danger, an alarm, and safety, wherein the stages may be displayed using different colors.

In the present invention, the error prediction information display unit may include a route display unit configured to display whether a network connection path is a main path or an alternative path; a network state value display unit configured to display a current state of the network; a final stability display unit configured to display the final network connection stability calculated by assigning weights to the connection state stability $S_{state}$ and the connection time stability $S_{time}$; a connection state stability display unit configured to display a result of calculating the connection state stability; and a connection time stability display unit configured to display a result of calculating the connection time stability.

In the present invention, the values of the states of the network may include one of: a value of a state representing a start operation of starting connection to the network; a value of a state representing a connection try operation of repeatedly trying connection to the network until connection to the network succeeds; a value of a state representing a connection operation in which connection to the network is made normally and information is exchanged; a value of a state representing a temporary error operation in which a temporary network connection error occurs; a value of a state representing a permanent error operation in which a permanent network connection error occurs; a value of a state representing an alternative connection try operation of trying to connect to the network using an available alternative path when connection to the network through a main path is difficult; a value of a state representing an alternative-path connection operation of connecting to the network through an alternative path rather than the main path; and a value of a state representing an end operation of ending connection to the network.

In the present invention, the start operation may be changed to the connection try operation when a predetermined time period elapses. The connection try operation may be changed to the connection operation when connection to the network succeeds, be changed to the permanent error operation when a number-of-times-to-retry-to-connect information value ConnRtryCnt until a state is changed from the temporary error state to the permanent error state is equal to a number-of-times-to-reject-trying-to-connect information value ConnRej, and be changed to the alternative connection try operation when a number-of-times-to-retry-to-connect information value ConnFailRtryCnt and the number-of-times-to-reject-trying-to-connect information value ConnRej are equal to each other in the permanent error state. The connection operation may be changed to the temporary error operation when a temporary connection error generation alarm ConnAlm is generated, and be changed to the end operation when data transmission is completed or connection to the network is ended normally. The temporary error operation may be changed to the connection try operation when a predetermined time period ConnRtryTmms elapses. The permanent error operation may be changed to the connection try operation when a predetermined time period ConnFailRtryTmms elapses. The alternative connection try operation may be changed to the alternative-path connection operation when there is an available alternative path AltPthSt, and be changed to the end operation when connection to the network is ended abnormally. The alternative-path connection operation may be changed to the end operation when connection to the network through an alternative path succeeds or connection to the network is ended normally.

In the present invention, the network connection stability calculation unit may calculate the final network connection stability S by adding a product of the connection state stability $S_{state}$ and a predetermined first weight and a product of the connection time stability $S_{time}$ and a predetermined second weight.

In the present invention, the connection state stability calculation unit may calculate the connection state stability $S_{state}$ using a variation in an operational value representing an unstable connection state and a total number of lines through which the network is connectable using an alternative path, wherein the unstable connection state may include the temporary error state or the permanent error state.

In the present invention, the connection time stability calculation unit may calculate the connection time stability $S_{time}$ from a current connection time versus an average connection time.

Another aspect of the present invention provides a method of calculating stability of a power system network and predicting an error thereof, the method including receiving, by a standard object information reception unit, standard object information from a network which is actually operated; calculating, by a connection state stability calculation unit, connection state stability $S_{state}$ representing whether a network connection state is stable on the basis of the standard object information; calculating, by a connection time stability calculation unit, connection time stability $S_{time}$ representing whether a network connection time is stably maintained on the basis of the standard object information; calculating, by a network connection stability calculation unit, final network connection stability using the connection state stability $S_{state}$ and the connection time stability $S_{time}$; and displaying, by an error prediction information display unit, error prediction information. The standard object information may include at least one of: a number of times to retry to connect to the network ConnRtryCnt until a state is changed from a temporary error state to a permanent error state; a number of times to retry to connect to the network ConnFailRtryCnt in the permanent error state; a number of times to reject trying to connect to the network ConnRej; a list of alternative paths to a main path NetAltPth; states of the alternative paths to the main path AltPthSt; and an available valid path availablePath. The standard object information may include at least one of: an average connection time ConnAvTnns; and a current-connection-state maintenance time ConnCurTmms after connection to the network. The error prediction information may include at least one of: the final network connection stability; the connection state stability $S_{state}$; the connection time stability $S_{time}$; and network path information and values of states of the network.

In the present invention, the calculating of the connection state stability $S_{state}$ may include, by the connection state stability calculation unit, calculating the connection state stability $S_{state}$ using a variation in an operational value representing an unstable connection state and a total number of lines through which the network is connectable using an alternative path, wherein the unstable connection state may include the temporary error state or the permanent error state.

In the present invention, the calculating of the connection time stability $S_{time}$ may include, by the connection time stability calculation unit, calculating the connection time stability $S_{time}$ from a current connection time versus an average connection time.

In the present invention, the calculating of the final network connection stability may include, by the network connection stability calculation unit, calculating the final network connection stability by adding a product of the connection state stability $S_{state}$ and a predetermined first weight and a product of the connection time stability $S_{time}$ and a predetermined second weight.

Advantageous Effects

According to the present invention, stability of a power system network is calculated in a formula on the basis of standard object information, and an error of the power system network is predicted using the stability. Thus, an operator may notice a state of a network before an error of the network occurs and may thus quickly and exactly respond when the error occurs (or when an alarm is generated), thereby preventing expansion of an accident.

BEST MODE FOR CARRYING OUT THE INVENTION

Hereinafter, a device and method for calculating stability of a power system network and predicting an error thereof according to an embodiment of the present invention will be described with reference to the accompanying drawings below.

In the drawings, the thicknesses of lines, the sizes of elements, etc. may be exaggerated for clarity and convenience of explanation. The terms used herein are defined in consideration of functions of the present invention and may be changed according to a user or operator's intentions or precedents. Thus, these terms should be defined based on the whole context of the present invention.

[Modes of the Invention]

Figure 1:
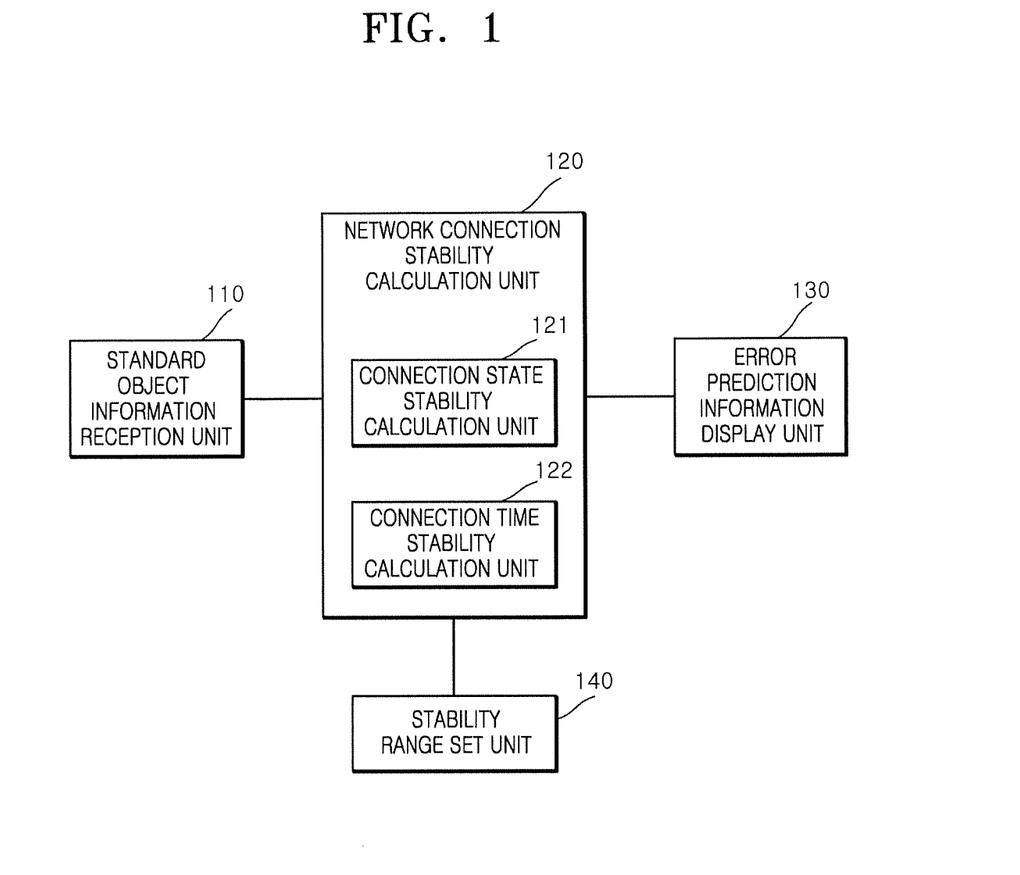
FIG. 1 is a diagram schematically illustrating a structure of a device for calculating stability of a power system network and predicting an error thereof, according to an embodiment of the present invention.

FIG. 1 is a diagram schematically illustrating a structure of a device for calculating stability of a power system network and predicting an error thereof, according to an embodiment of the present invention.

As illustrated in FIG. 1, a device for calculating stability of a power system network and predicting an error thereof according to the present embodiment includes a standard object information reception unit 110, a network connection stability calculation unit 120, a connection state stability calculation unit 121, a connection time stability calculation unit 122, an error prediction information display unit 130, and a stability range set unit 140.

The standard object information reception unit 110 receives information (standard object information) according to a standard (IEC62351-7) from a predetermined specific power system network.

The network connection stability calculation unit 120 calculates final network connection stability using network connection state stability $S_{state}$ and connection time stability $S_{time}$.

Figure 2:
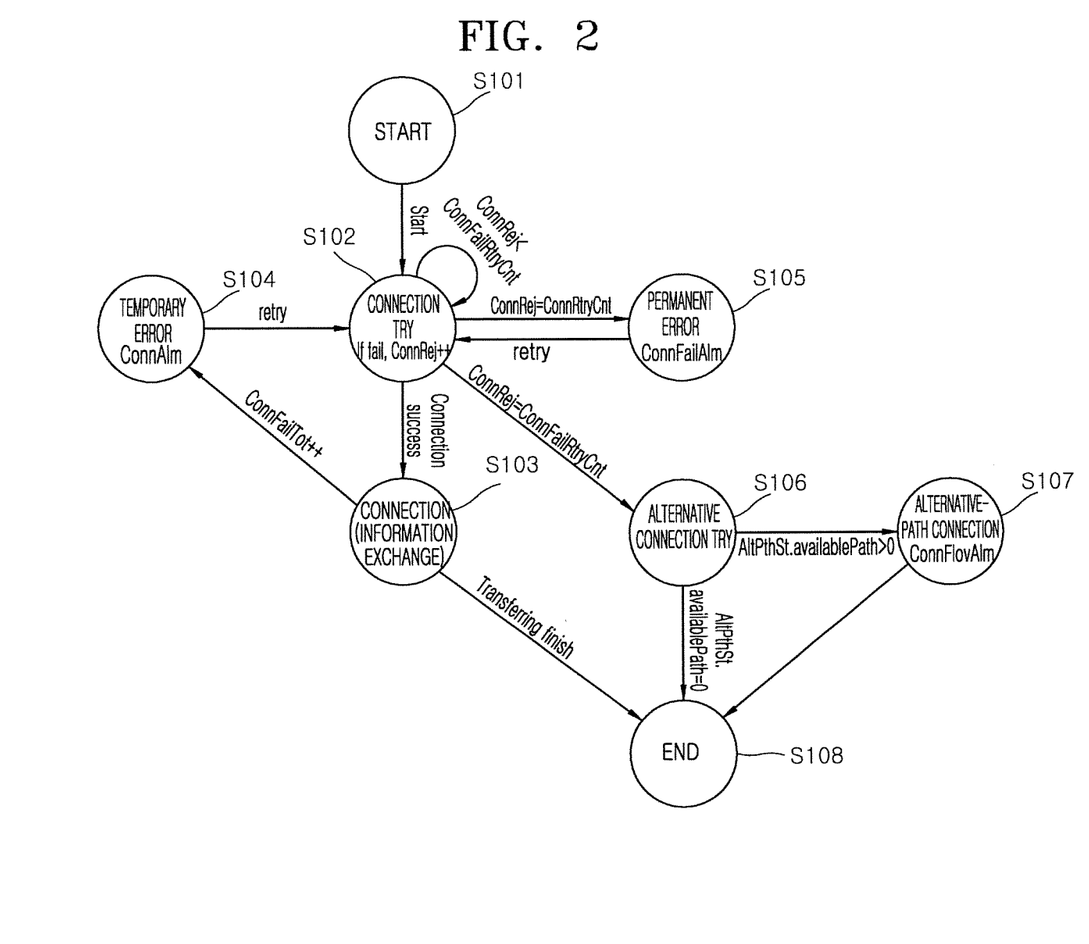
FIG. 2 is a diagram illustrating a state change table showing a current state of a network and a change in the state of the network, according to an embodiment of the present invention.

In the present embodiment, interconnection is assigned to standard object information shown in Table 1 above, and states and a state change table are defined so that an operator of a power system can intuitively know a current network state (see FIG. 2).

Figure 3:
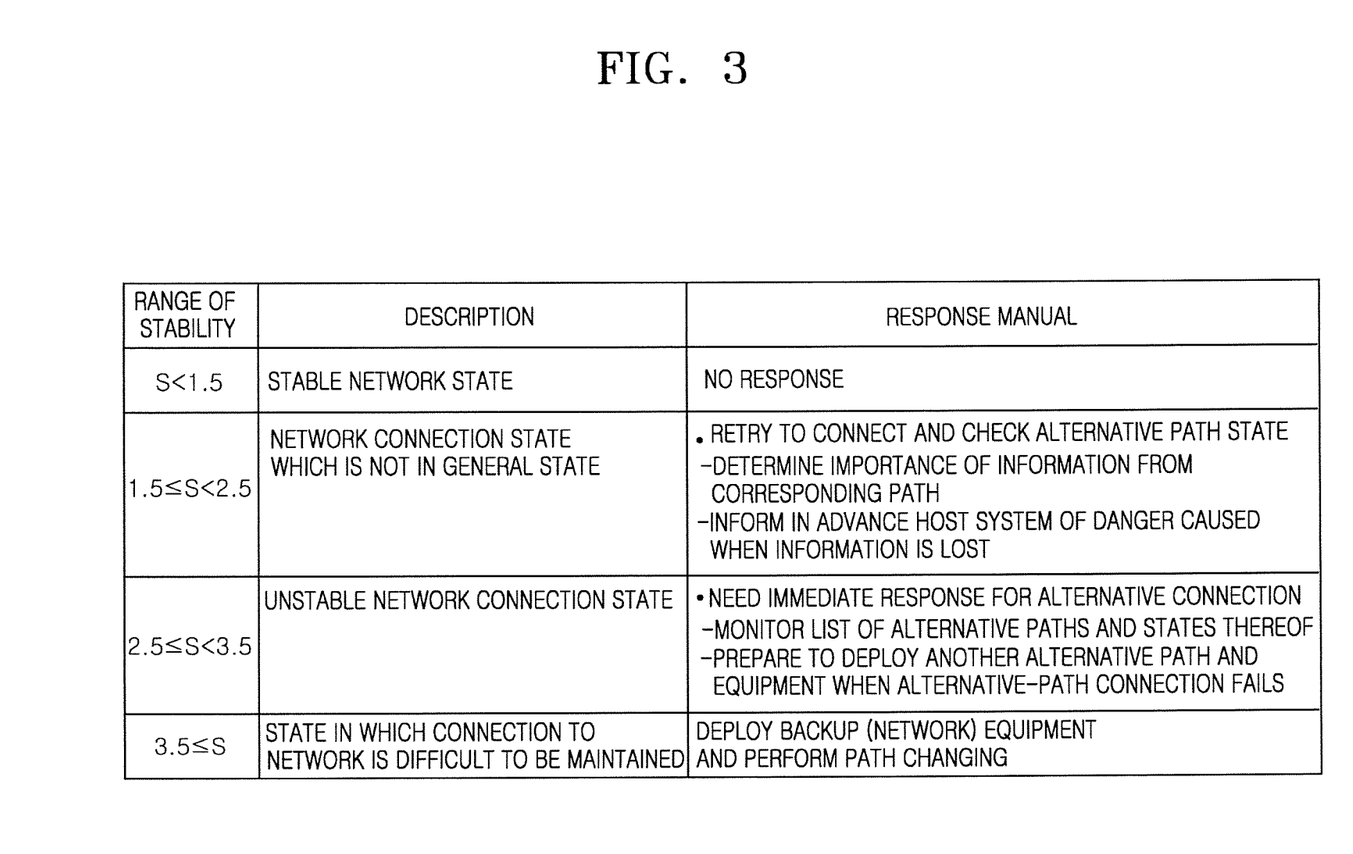
FIG. 3 is a table showing an operation in each state included in the state change table of FIG. 2, an example of a state to which each state may be changed, and state change conditions.

FIG. 2 is a diagram illustrating a state change table showing a current state of a network and a change in the state of the network, according to an embodiment of the present invention. FIG. 3 is a table showing an operation in each state included in the state change table of FIG. 2, an example of a state to which each state may be changed, and state change conditions. States of a network and a process of changing the state of the network to another state will be described with reference to FIGS. 2 and 3 below.

As illustrated in FIG. 2, a start operation S101 is an operation of starting connection to a network, and is changed to a connection try operation S102 after a predetermined time period elapses.

In the connection try operation S102, connection to the network is repeatedly tried until the connection to the network succeeds, in which a connection failure information value (e.g., ConnRej) is increased by '1' whenever the connection to the network fails. The connection try operation S102 is changed to a connection (or information exchange) operation S103 when the connection to the network succeeds, is changed to a permanent error operation S105 when a number-of-times-to-retry-to-connect information value ConnRtryCnt until a state is changed from a temporary error state to a permanent error state is equal to a number-of-times-to-reject-trying-to-connect information value ConnRej, and is changed to an alternative connection try operation S106 when a number-of-times-to-retry-to-connect information value ConnFailRtryCnt and the number-of-times-to-reject-trying-to-connect information value ConnRej are equal to each other in the permanent error state.

In the connection (or information exchange) operation S103, connection to the network is made normally and thus information is exchanged. The connection (or information exchange) operation S103 is changed to a temporary error operation S104 when a temporary connection error generation alarm ConnAlm is generated, and is changed to an end operation S108 when data transmission is completed or the connection to the network is ended normally.

In the temporary error operation S104, a temporary network connection error occurs. The temporary error operation S104 is changed to the connection try operation S102 when a predetermined time period ConnRtryTmms elapses.

In the permanent error operation S105, a permanent network connection error occurs. The permanent error operation S105 is changed to the connection try operation S102 when a predetermined time period ConnFailRtryTmms elapses.

In the alternative connection try operation S106, connection to the network is tried using an available alternative path when it is difficult to connect to the network using a main path. The alternative connection try operation S106 is changed to an alternative-path connection operation S107 when there is an accessible alternative path AltPthSt, and is changed to the end operation S108 when connection to the network is ended abnormally.

In the alternative-path connection operation S107, the network is connected using the alternative path rather than the main path. The alternative-path connection operation S107 is changed to the end operation S108 when connection to the network using the alternative path succeeds or when connection to the network is ended normally.

In the end operation S108, a current connection to the network is ended.

In this case, only the temporary connection error generation alarm ConnAlm provided in the temporary error operation S104, an alarm ConnFailAlm provided in the permanent error operation S105, and an alarm ConnFlovAlm provided in the alternative-path connection operation S107 are provided in the IEC standard (IEC62351-7).

However, these alarms are aimed to simply inform an operator of a network error result but are not information through which the operator may notice a state (stability) of the network and deal with an accident beforehand. Thus, in the present embodiment, network connection stability may be digitized and calculated so that an operator may intuitively notice a current state and stability whenever the network is connected.

The network connection stability may be divided largely into connection state stability $S_{state}$ and connection time stability $S_{time}$. In the present embodiment, the network connection stability calculation unit 120 calculates the final network connection stability S by assigning weights to the connection state stability $S_{state}$ and the connection time stability $S_{time}$.

For example, the final network connection stability S=connection state stability $S_{state}$×weight (e.g., 80%)+connection time stability $S_{time}$×weight (e.g., 20%). Here, the ratio between the weights is variable.

If a proactive response manual is prepared according to the final network connection stability S and an operator masters the proactive response manual to respond to an accident according to the proactive response manual, expansion of the accident may be effectively prevented.

FIG. 3 is a table showing definition of final network connection stability and a response manual according to an embodiment of the present invention. As illustrated in FIG. 3, when final network connection stability S is less than first stability, e.g., 1.5, a network connection state is stable and thus an operator need not make a response.

When the final network connection stability S is greater than or equal to the first stability, e.g., 1.5, and is less than second stability, e.g., 2.5, a network connection state is not in a range of normal state. Thus the operator may check whether connection to a network is retried, check a state of an alternative path, determine the importance of information from the alternative path, and inform a host system of a danger caused when information is lost.

When the final network connection stability S is greater than or equal to the second stability, e.g., 2.5, and is less than third stability, e.g., 3.5, a network connection state is unstable. Thus, the operator should immediately respond for alternative connection, monitor a list of alternative paths and states thereof, and prepare another alternative path and equipment when connection to the network using an alternative path fails.

When the final network connection stability S is greater than the third stability, e.g., 3.5, a network connection state is difficult to be maintained. Thus, the operator may deploy a network backup device and perform path changing. In this case, a response manual according to the stability S is merely an example and is variable.

The connection state stability calculation unit 121 calculates connection state stability $S_{state}$ using the standard object information received by the standard object information reception unit 110.

The connection state stability $S_{state}$ is calculated from a variation in an operational value representing an unstable connection state (e.g., a temporary error, a permanent error, or the like) and a total number of lines through which the network may be connected using an alternative path.

For example, when a connection error occurs, the connection state stability decreases as a number of times to retry to connect to the network versus a predetermined counter ConnRtryCnt or ConnFailRtryCnt for determining a change in a network state increases. In contrast, the connection state stability increases as the number of available alternative paths # of AltPthSt.availablePath+1 to a main path increases among the number of a list of alternative paths # of NetAltPth+1.

The connection state stability $S_{state}$ may be calculated by Equation 1 below.

$$S_{state}[\%] = \frac{ConnRtryCnt + ConnFailRtryCnt - ConnRej}{ConnRtryCnt + ConnFailRtryCnt} \times \frac{\# \text{ of } AltPthSt - availablePath + 1}{\# \text{ of } NetAltPth + 1}$$ [Equation 1]

Here, ConnRtryCnt represents a number of times to retry to connect to the network until a state is changed from the temporary error state to the permanent error state, ConnFailRtryCnt represents a number of times to retry to connect to the network in the permanent error state, ConnRej represents a number of times to reject trying to connect to the network, NetAltPth represents a list of alternative paths to a main path, AltPthSt represents states of the alternative paths to the main path, and availablePath represents an available valid path. Furthermore, # represents a total number, and +1 represents a random value to be added to prevent a result of an arithmetic formula from being zero.

The connection time stability calculation unit 122 calculates connection time stability $S_{time}$ using the standard object information received by the standard object information reception unit 110.

The connection time stability $S_{time}$ is calculated from a current-connection-state maintenance time ConnCurTmms versus an average connection time ConnAvTmms.

For example, when an error occurs in relation to the connection time stability $S_{time}$ and causes a frequent change between trying to connect to the network and a connection state, a connection time increases and a number of times to retry to connect to the network significantly increases. Thus, when connection to the network is ended abnormally, a connection time decreases. Stability is highest when the connection state stability $S_{state}$ is 100% or less and 100% or more, and decreases as the connection state stability $S_{state}$ increases to be more than 100% or decreases to be less than 100% (see FIG. 5).

The connection time stability $S_{time}$ may be calculated by Equation 2 below.

$$S_{time}[\%] = \frac{ConnCurTmms}{ConnAvTmms}$$ [Equation 2]

Here, ConnAvTmms represents an average connection time, and ConnCurTmms represents a current-connection-state maintenance time after connection to the network.

The error prediction information display unit 130 displays network connection stability calculated by the network connection stability calculation unit 120 in stages (e.g., state changing, a danger, an alarm, safety, etc.) so that an operator may intuitively determine the network connection stability (see FIG. 3).

Figure 4:
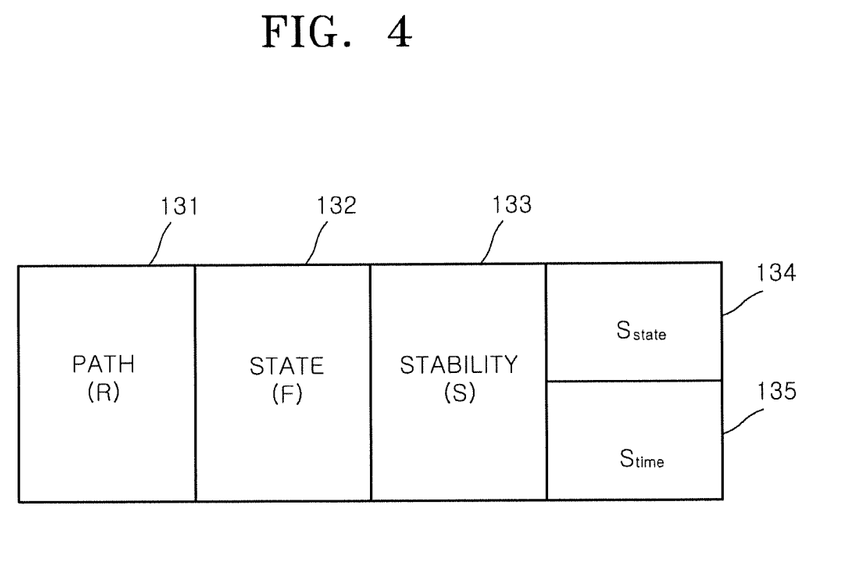
FIG. 4 is a diagram illustrating a method of displaying error prediction information related to the device of FIG. 1.

FIG. 4 is a diagram illustrating a method of displaying error prediction information related to the device of FIG. 1.

As illustrated in FIG. 4, when it is assumed that network stability between a random host A and a host B is displayed, the error prediction information display unit 130 includes a route display unit 131, a network state value display unit 132, a final stability display unit 133, a connection state stability display unit 134, and a connection time stability display unit 135.

The route display unit 131 displays whether a current network connection path is a main path (primary path) P or an alternative path (second path) S. The network state value display unit 132 displays a current state of a network (one of eight states thereof) (see FIG. 2). The final stability display unit 133 displays final network connection stability calculated by assigning weights to connection state stability $S_{state}$ and connection time stability $S_{time}$. The connection state stability display unit 134 displays a result of calculating the connection state stability $S_{state}$. The connection time stability display unit 135 calculates a result of calculating the connection time stability $S_{time}$.

A method of referring to information displayed on the route display unit 131 will be described below.

For example, when a network path is displayed as the alternative path S on the route display unit 131, it means that a problem has already occurred once or more. Thus, an operator should carefully monitor a connection state. A state of the network is a most stable state when a value of the state of the network displayed on the network state value display unit 132 represents the connection operation S103, is a state in which an error occurs and which thus needs attention when the value of the state represents the temporary error operation S104 or the permanent error operation S105, and is a state in which connection to the network using the alternative path S succeeds and which thus needs to be carefully monitored whether the state is continuously stably maintained when the value of the state represents the alternative-path connection operation S107. The final stability display unit 133 may display final network connection stability, and an operator's response may be thus additionally prepared and operated according to this stability.

Each of the display units 131 to 135 may classify stabilities according to stages (e.g., state changing, a danger, an alarm, safety, etc.), determine specific colors (e.g., red, yellow, white, green, etc.) to correspond to the stabilities, and display the stabilities using the colors. That is, it is possible to help an operator's intuitive determination by assigning the colors to the stages.

The stability range set unit 140 determines ranges of the connection state stability $S_{state}$ and the connection time stability $S_{time}$. Instability and final network connection stability are calculated on the basis of the determined ranges.

Figure 5:
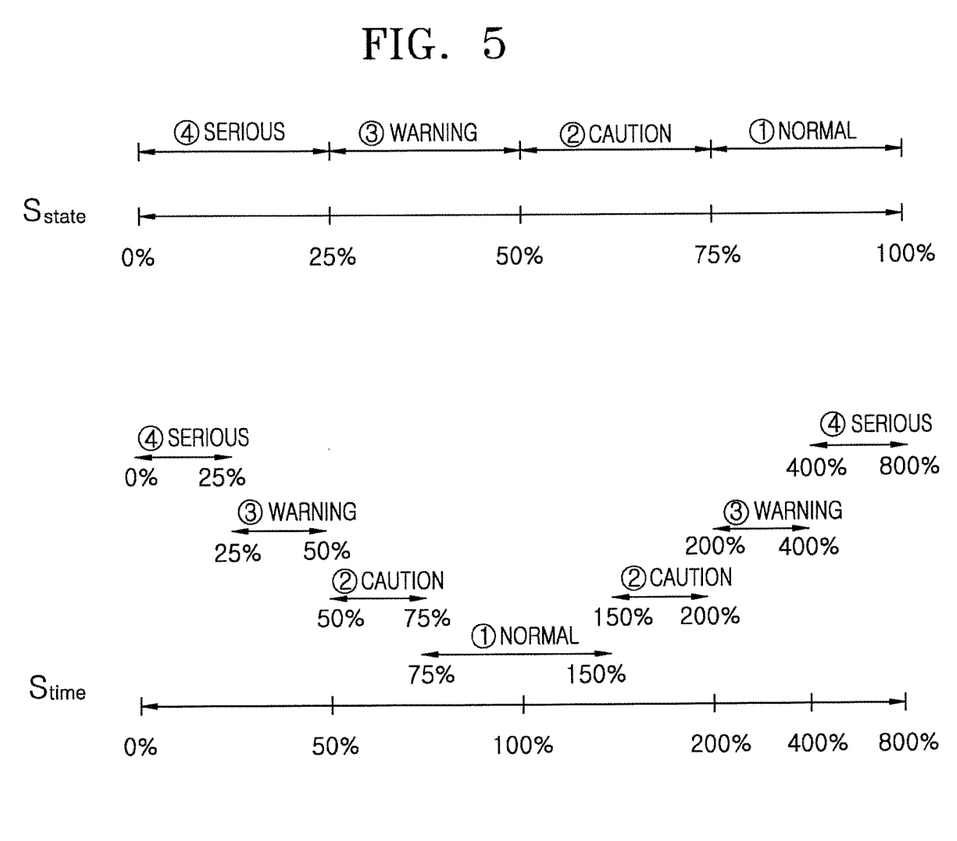
FIG. 5 is a diagram illustrating ranges of connection state stability and connection time stability according to an embodiment of the present invention.

FIG. 5 is a diagram illustrating ranges of connection state stability and connection time stability according to an embodiment of the present invention. As illustrated in FIG. 5, a range of connection state stability $S_{state}$ is determined such that 0% to 25% represents a serious state, 25% to 50% represents a waring state, 50% to 75% represents a caution state, and 75% to 100% represents a normal state.

A range of connection time stability $S_{time}$ is determined such that 0% to 25% represents a serious state, 25% to 50% represents a warning state, 50% to 75% represents a caution state, 75% to 150% represents a normal state, 150% to 200% represents a caution state, 200% to 400% represents a warning state, and 400% to 800% represents a serious state. In this case, the ranges of the connection state stability $S_{state}$ and the connection time stability $S_{time}$ are merely examples and are thus variable.

Figure 6:
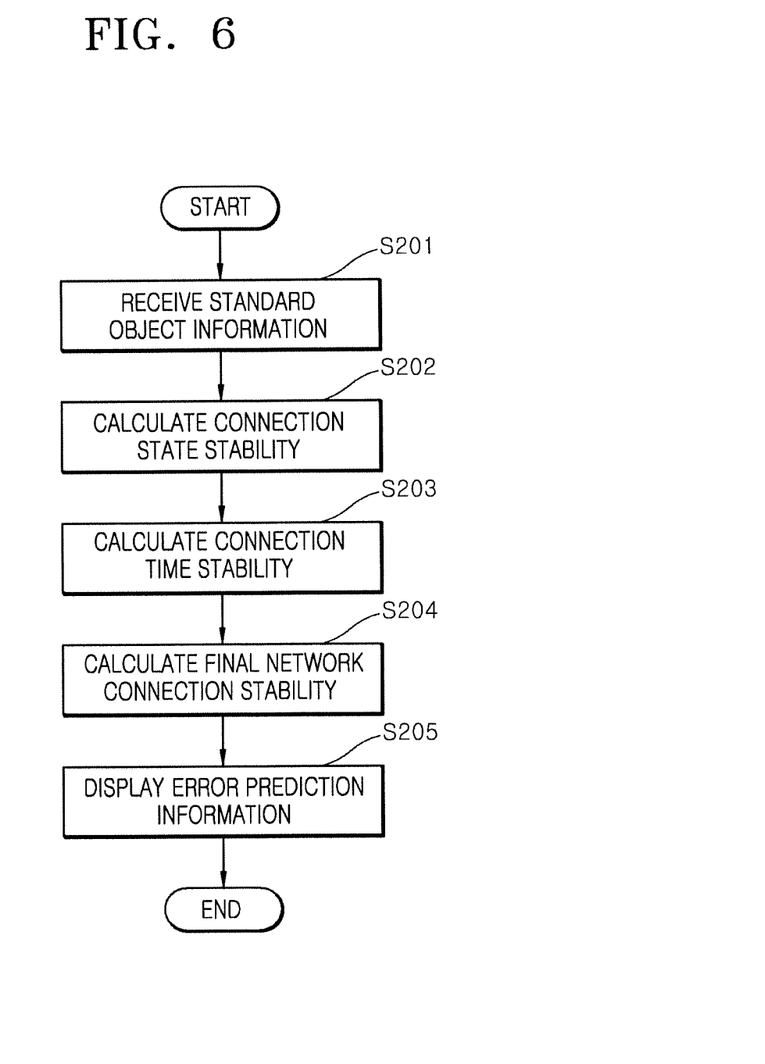
FIG. 6 is a flowchart of a method of calculating stability of a power system network and predicting an error thereof, according to an embodiment of the present invention.
Figure 7:
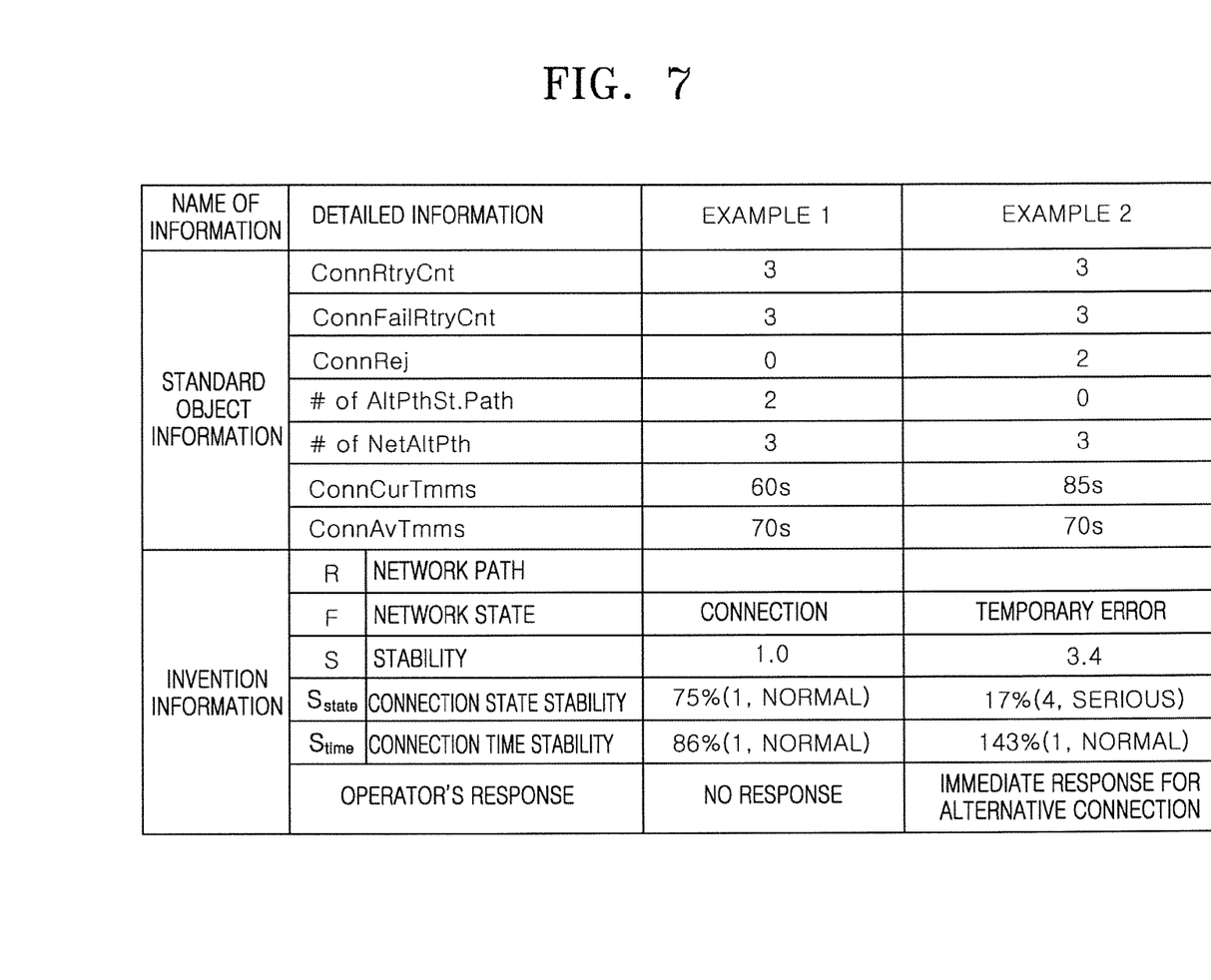
FIG. 7 is a table showing a method of calculating stability on the basis of a method of calculating stability of a power system network and predicting an error thereof, and a method of making a response according to the stability, according to an embodiment of the present invention.

FIG. 6 is a flowchart of a method of calculating stability of a power system network and predicting an error thereof, according to an embodiment of the present invention. FIG. 7 is a table showing a method of calculating stability on the basis of a method of calculating stability of a power system network and predicting an error thereof, and a method of making a response according to the stability, according to an embodiment of the present invention.

A method of calculating stability of a network and predicting an error thereof according to the present embodiment will be described with reference to FIGS. 6 and 7 below.

As illustrated in FIG. 6, the standard object information reception unit 110 receives standard object information as shown in the table of FIG. 7 during actual operation of a network (S201). For convenience of explanation, it is assumed that two types of standard object information (e.g., Examples 1 and 2) are received.

The connection state stability calculation unit 121 calculates connection state stability using Equation 1 above on the basis of the standard object information (S202).

For example, as illustrated in FIG. 7, connection state stability calculated using the standard object information input as Example 1 is 75% and thus represents a normal stability state but connection state stability calculated using the standard object information input as Example 2 is 17% and thus represents a serious stability state.

The connection time stability calculation unit 122 calculates connection time stability using Equation 2 above (S203).

For example, as illustrated in FIG. 7, connection time stability calculated using the standard object information input using Example 1 is 86% and thus represents a normal stability state, and connection time stability calculated using the standard object information input using Example 2 is 143% and thus also represents a normal stability state.

Thus, the network connection stability calculation unit 120 calculates final network connection stability S using the connection state stability and the connection time stability (S204).

For example, as illustrated in FIG. 7, final network connection stability S according to Example 1 is 1.0 and thus represents a stable network connection state, and final network connection stability S according to Example 2 is 3.4 and thus represents an unstable network connection state.

The error prediction information display unit 130 displays error prediction information calculated using the standard object information, such as path information R, a network state F, stability S, connection state stability $S_{state}$, connection time stability etc. (S205).

Compared to the final network connection stability S according to Example 2, the final network connection stability S according to Example 1 represents a normal state, in which information is exchanged in a stable state, two available alternative paths are secured, and connection time stability gradually increases as it changes from a 'caution' state to a 'normal' state. Thus, an operator need not make any response.

In contrast, the final network connection stability S according to Example 2 is in a serious state which is a temporary error state since retrying to connect to the network fails twice and in which no alternative paths are secured, deployment of network backup equipment should be considered, a connection time gradually increases due to frequent errors, and connection time stability is about to be changed to a 'warning' state. Thus, an operator should prepare for an immediate response for alternative connection.

As described above, in the present embodiment, stability of a power system network may be calculated in a formula on the basis of standard object information and an error thereof may be predicted using the stability. Thus, an operator may notice a state of the power system network before a network error occurs, and may thus immediately and exactly respond to an error when the error occurs (or when an alarm is generated), thereby improving accident response capabilities.

Although the present invention has been described above with reference to the embodiments illustrated in the drawings, these embodiments are merely examples and it would be obvious to those of ordinary skill in the art that various changes may be made to these embodiments and these embodiments are to cover all modifications, equivalents, and alternatives falling within the scope of the invention. Accordingly, the scope of the invention should be defined in the appended claims.

The invention claimed is:

1. A device for determining stability of a power system network and predicting an error thereof, the device comprising a processor configured to:
receive standard object information from a power system network;
determine connection state stability $S_{state}$ representing when a network connection state is stable on the basis of the standard object information, wherein the standard object information comprises at least one of:
a number of times to retry to connect to the network ConnRtryCnt until a state is changed from a temporary error state to a permanent error state;
a number of times to retry to connect to the network ConnFailRtryCnt in the permanent error state;
a number of times to reject trying to connect to the network ConnRej;
a list of alternative paths to a main path NetAltPth;
states of the alternative paths to the main path AltPthSt; or
an available valid path availablePath;
determine connection time stability $S_{time}$ representing when a network connection time is stably maintained on the basis of the standard object information, wherein the standard object information comprises at least one of:
an average connection time ConnAvTmms; or
a current-connection-state maintenance time ConnCurTmms after connection to the network;
determine final network connection stability using the network connection state stability $S_{state}$ and the connection time stability $S_{time}$,
wherein the device further comprises:
an error prediction information display device connected to the processor and displaying error prediction information determined using the determined standard object information, to notify an operator with a current state of the network, and
wherein the error prediction information comprises at least one of:
the final network connection stability;
the connection state stability $S_{state}$;
the connection time stability $S_{time}$; or
network path information and values of states of the network.

2. The device of claim 1, wherein the error prediction information display device classifies and displays the final network connection stability in stages including at least one among state changing, a danger, an alarm, and safety,
wherein the stages are displayed using different colors.

3. The device of claim 1, wherein the error prediction information display device comprises:
a route display device configured to display whether a network connection path is a main path or an alternative path;
a network state value display device configured to display the current state of the network;
a final stability device configured to display the final network connection stability determined by assigning weights to the connection state stability $S_{state}$ and the connection time stability;
a connection state stability display device configured to display a result of determining the connection state stability; and
a connection time stability display device configured to display a result of determining the connection time stability.

4. The device of claim 1, wherein the values of the states of the network comprises one of:
a value of a state representing a start operation of starting connection to the network;
a value of a state representing a connection try operation of repeatedly trying connection to the network until connection to the network succeeds;
a value of a state representing a connection operation in which connection to the network is made normally and information is exchanged;
a value of a state representing a temporary error operation in which a temporary network connection error occurs;
a value of a state representing a permanent error operation in which a permanent network connection error occurs;
a value of a state representing an alternative connection try operation of trying to connect to the network using an available alternative path when connection to the network through a main path is difficult;
a value of a state representing an alternative-path connection operation of connecting to the network through an alternative path rather than the main path; and
a value of a state representing an end operation of ending connection to the network.

5. The device of claim 4,
wherein the start operation is changed to the connection try operation when a predetermined time period elapses,
wherein the connection try operation is changed to the connection operation when connection to the network succeeds, is changed to the permanent error operation when a number-of-times-to-retry-to- connect information value ConnRtryCnt until a state is changed from the temporary error state to the permanent error state is equal to a number-of-times-to-reject -trying-to-connect information value ConnRej, and is changed to the alternative connection try operation when a number-of-times-to-retry- to-connect information value ConnFailRtryCnt and the number-of-times-to-reject-trying-to-connect information value ConnRej are equal to each other in the permanent error state,
wherein the connection operation is changed to the temporary error operation when a temporary connection error generation alarm ConnAlm is generated, and is changed to the end operation when data transmission is completed or connection to the network is ended normally,
wherein the temporary error operation is changed to the connection try operation when a predetermined time period ConnRtryTmms elapses,
wherein the permanent error operation is changed to the connection try operation when a predetermined time period ConnFailRtryTmms elapses,
wherein the alternative connection try operation is changed to the alternative-path connection operation when there is an available alternative path AltPthSt, and is changed to the end operation when connection to the network is ended abnormally, and
wherein the alternative-path connection operation is changed to the end operation when connection to the network through an alternative path succeeds or connection to the network is ended normally.

6. The device of claim 1, wherein the processor determines the final network connection stability by adding a product of the connection state stability $S_{state}$ and a predetermined first weight and a product of the connection time stability $S_{time}$ and a predetermined second weight.

7. The device of claim 1, wherein the processor determines the connection state stability $S_{state}$ using a variation in an operational value representing an unstable connection state and a total number of lines through which the network is connectable using an alternative path, wherein the unstable connection state comprises the temporary error state or the permanent error state.

8. The device of claim 1, wherein the processor determines the connection time stability $S_{time}$ from a current connection time versus an average connection time.

9. A method of determining stability of a power system network and predicting an error thereof, the method comprising:
receiving, by a processor, standard object information from a network which is actually operated;
determining, by the processor, connection state stability $S_{state}$ representing when a network connection state is stable on the basis of the standard object information, wherein the standard object information comprises at least one of:
a number of times to retry to connect to the network ConnRtryCnt until a state is changed from a temporary error state to a permanent error state;
a number of times to retry to connect to the network ConnFailRtryCnt in the permanent error state;
a number times to reject trying to connect to the network ConnRej;
a list of alternative paths to a main path NetAltPth; or
states of the alternative paths to the main path AltPthSt; and an available valid path availablePath;
determining, by the processor, connection time stability $S_{time}$ representing when a network connection time is stably maintained on the basis of the standard object information, wherein the standard object information comprises at least one of:
an average connection time ConnAvTmms; or
a current-connection-state maintenance time ConnCurTmms after connection to the network;
determining, by the processor, final network connection stability using the connection state stability $S_{state}$ and the connection time stability $S_{time}$; and
displaying, by an error prediction information display device connected to the processor, error prediction information determined using the determined standard object information, to notify an operator with a current state of the network, wherein the error prediction information comprises at least one of:
the final network connection stability; the connection state stability $S_{state}$;
the connection time stability $S_{time}$; or
network path information and values of states of the network.

10. The method of claim 9, wherein the determining of the connection state stability $S_{state}$ comprises, by the processor, determining the connection state stability $S_{state}$ using a variation in an operational value representing an unstable connection state and a total number of lines through which the network is connectable using an alternative path, wherein the unstable connection state comprises the temporary error state or the permanent error state.

11. The method of claim 9, wherein the determining of the connection time stability $S_{time}$ comprises, by the processor, determining the connection time stability $S_{time}$ from a current connection time versus an average connection time.

12. The method of claim 9, wherein the determining of the final network connection stability comprises, by the processor, determining the final network connection stability by adding a product of the connection state stability $S_{state}$ and a predetermined first weight and a product of the connection time stability $S_{time}$ and a predetermined second weight.

\* \* \* \* \*